(12) United States Patent
Kaukewitsch et al.

(10) Patent No.: US 11,507,483 B2
(45) Date of Patent: Nov. 22, 2022

(54) METHOD FOR ANALYZING A PHYSICAL SYSTEM ARCHITECTURE OF A SAFETY-CRITICAL SYSTEM

(71) Applicant: SIEMENS AKTIENGESELLSCHAFT, Munich (DE)

(72) Inventors: Christof Kaukewitsch, Munich (DE); Jean-Pascal Schwinn, Munich (DE); Marc Zeller, Munich (DE); Sebastian Klabes, Zurich (CH)

(73) Assignee: SIEMENS AKTIENGESELLSCHAFT

( * ) Notice: Subject to any disclaimer, the term of this patent is extended or adjusted under 35 U.S.C. 154(b) by 1052 days.

(21) Appl. No.: 16/181,385

(22) Filed: Nov. 6, 2018

(65) Prior Publication Data

US 2019/0138416 A1    May 9, 2019

(30) Foreign Application Priority Data

Nov. 9, 2017   (EP) .................................... 17200871

(51) Int. Cl.
  *G06F 30/20*      (2020.01)
  *G06F 11/27*      (2006.01)
  (Continued)

(52) U.S. Cl.
  CPC .......... G06F 11/27 (2013.01); G05B 23/0218 (2013.01); G05B 23/0248 (2013.01); G06F 1/18 (2013.01); G06F 11/008 (2013.01); G06F 30/00 (2020.01); G06F 30/20 (2020.01); G06F 2117/08 (2020.01)

(58) Field of Classification Search
  CPC .......... G06F 11/27; G06F 30/20; G06F 30/00; G06F 1/18; G06F 11/008; G06F 2117/08; G06F 30/10; G06F 30/12; G05B 23/0218; G05B 23/0248
  See application file for complete search history.

(56) References Cited

U.S. PATENT DOCUMENTS

2012/0330501 A1* 12/2012 Sundaram .......... G05B 23/0248
                                                      701/33.9
2016/0266952 A1*  9/2016 Höfig ...................... G06F 11/00

FOREIGN PATENT DOCUMENTS

WO       2016173624 A1   11/2016
WO    WO 2016173624 A1   11/2016

OTHER PUBLICATIONS

Zeller et al. (Non-Patented Literature, "ALFRED: A Methodology to Enable Component Fault Trees for Layered Architectures", hereinafter "Zeller") (Year: 2015).*

(Continued)

*Primary Examiner* — Chuen-Meei Gan
(74) *Attorney, Agent, or Firm* — Schmeiser, Olsen & Watts LLP

(57) ABSTRACT

Provided is a method for analyzing and designing a physical system architecture of a safety-critical system, wherein a physical system analysis model representing the physical system architecture of the safety-critical system is modified incrementally until calculated failure rates of failure modes of the physical system analysis model are less or equal to failure rates of corresponding failure modes of a functional system analysis model representing a functional system architecture of the safety-critical system.

11 Claims, 8 Drawing Sheets

(51) Int. Cl.
*G06F 1/18* (2006.01)
*G06F 30/00* (2020.01)
*G05B 23/02* (2006.01)
*G06F 11/00* (2006.01)
*G06F 117/08* (2020.01)

(56) References Cited

OTHER PUBLICATIONS

Rupanov et al. (Non-Patented Literature, "Employing early model-based safety evaluation to iteratively derive E/E architecture design", hereinafter "Rupanov"). (Year: 2012).*

Muller et al. (Non-Patented Literature, "The Hazard Analysis Profile: Linking Safety Analysis and SysML") (Year: 2016).*

Müller M, Roth M, Lindemann U. The hazard analysis profile: Linking safety analysis and SysML. In2016 Annual IEEE Systems Conference (SysCon) Apr. 18, 2016 (pp. 1-7). IEEE. (Year: 2016).*

Muller Martina et al: The hazard analysis profile: Linking safety analysis and SysML, 2016 Annual IEEE Systems Conference (SYSCON), IEEE, pp. 1-7, XP032911608, DOI: 10.1109/SYSCON. 2016.7490532 [retrieved on Jun. 13, 2016] abstract, pp. 4; 2018.

Seppo Sierla et al: "Early integration of safety to the mechatronic system design process by the functional failure identification and propagation framework", Mechatronics, Pergamon Press, Oxford, GB, vol. 22, No. 2, pp. 137-151, XP028467577, ISSN: 0957-4158, DOI: 10.1016/J.MECHATRONICS.2012.01.003, [retrieved on Jan. 17, 2012] abstract pp. 137-142, pp. 149, col. 1; 2012.

Hoefig, Kai et al; "ALFRED: A Methodology to enable component fault trees for layered architectures"; 41st Euromicro Conference on Software Engineering and Advanced Applications; pp. 167-176; DOI: 10.1109/SEAA.2015.26; [retrieved on Oct. 20, 2015] abstract, pp. 167, pp. 169, col. 1, paragraph 3—pp. 174; 2015.

Prosvirnova Tatiana et al: Handling Consistency Between Safety and System Models, Medical Image Computing and Computer-Assisted Intervention—MICCAI 2015 : 18th International Conference, Munich, Germany, Oct. 5-9, 2015; Proceedings; [Lecture Notes in Computer Science; Lect.Notes Computer], Springer International Publishing, CH, XP047425372, ISSN: 0302-9743, ISBN: 978-3-319-69952-3 [retrieved on Aug. 2, 2017] abstract 1-14, p. 25; 2017.

Extended European Search Report, Application No. 17200871.6, dated Jun. 8, 2018.

* cited by examiner

METHOD FOR ANALYZING A PHYSICAL SYSTEM ARCHITECTURE OF A SAFETY-CRITICAL SYSTEM

CROSS-REFERENCE TO RELATED APPLICATIONS

This application claims priority to European Application No. 17200871.6, having a filing date of Nov. 9, 2017 the entire contents of which are hereby incorporated by reference.

FIELD OF TECHNOLOGY

The following relates to a method for analyzing and/or designing a physical system architecture of a safety-critical system.

BACKGROUND

The importance of safety-critical systems in many application domains of embedded systems, such as aerospace, railway, health care, automotive and industrial automation is continuously growing. Thus, along with a growing system complexity of the safety-critical system, also the effort to design and assure a safe and reliable system is increasing drastically. Further, in many application domains of safety-critical systems, industrial norms and regulations in form of safety standards must be satisfied. Moreover, reliability requirements can be defined in contracts between the customer and the vendor of a component used in the safety-critical system.

Besides a large set of functional requirements, a system architecture of a safety-critical system must satisfy the non-functional requirements, i.e. safety and reliability requirements to fulfill the customers' needs and to be certified by a regulatory body. In order to cope with the increasing system complexity, while preserving the high quality demands in the application domain of safety-critical systems and reducing a time-to-market for designed products, for the design of the system architecture there is a need to support a systematic development process which ensures that the resulting architecture of the safety-critical system does satisfy the safety and reliability requirements.

SUMMARY

An aspect relates to a method and apparatus which supports a systematic development process of a physical system architecture of a safety-critical system ensuring that predefined safety and reliability requirements are fulfilled by the designed safety critical system.

The following provides according to the first aspect of embodiments of the present invention a method for analyzing and designing a physical system architecture of a safety-critical system, wherein a physical system analysis model representing the physical system architecture of said safety-critical system is modified incrementally until calculated failure rates of failure modes of said physical system analysis model are less or equal to failure rates of corresponding failure modes of a functional system analysis model representing a functional system architecture of said safety-critical system.

In a possible embodiment of the method according to the first aspect of embodiments of the present invention, the physical system architecture comprises hardware components, software components and/or embedded software components represented in said physical system analysis model.

In a possible embodiment of the method according to the first aspect of embodiments of the present invention, for each function of the functional system architecture a component fault free element is specified having input failure modes and/or output failure modes, wherein for each failure mode, a failure rate is specified which represents a corresponding safety or reliability requirement of said safety-critical system.

In a further possible embodiment of the method according to the first aspect of embodiments of the present invention, for each function of the functional system architecture represented by the functional system analysis model associated elements within the physical system architecture represented by the physical system analysis model adapted to implement the respective function are specified.

In a further possible embodiment of the method according to the first aspect of embodiments of the present invention, for each associated element of the physical system analysis model a component fault tree element is generated automatically based on the specified relationship between the functional system analysis model and the physical system analysis model of said safety-critical system.

In a further possible embodiment of the method according to the first aspect of embodiments of the present invention, for each failure model of a component fault tree element specified for a function of the functional system analysis model implemented by the associated element in the physical system analysis model a corresponding failure mode is created in the respective component fault tree elements.

In a further possible embodiment of the method according to the first aspect of embodiments of the present invention, the generated component fault tree element of the associated element of the physical system analysis model comprises information available in the component fault tree elements of the respective functions within the functional system analysis model implemented by the associated element.

In a further possible embodiment of the method according to the first aspect of embodiments of the present invention, a quantitative fault tree analysis is performed for each output failure mode of the physical system analysis model consisting of the generated component fault tree elements to calculate a failure rate of the respective output failure mode.

In a further possible embodiment of the method according to the first aspect of embodiments of the present invention, all failure rates of the output failure modes of the physical system analysis model are compared pairwise with the failure rates of the corresponding output failure modes of the functional system analysis model consisting of the component fault tree elements of the functions within the functional system architecture of said safety-critical system.

In a further possible embodiment of the method according to the first aspect of embodiments of the present invention, the physical system analysis model representing the physical system architecture of said safety-critical system and the functional system analysis model representing the functional system architecture of said safety-critical system are modeled in an architecture description language and stored in a memory.

In a further possible embodiment of the method according to the first aspect of embodiments of the present invention, the architecture description language comprises SYSML.

In a further possible embodiment of the method according to the first aspect of embodiments of the present invention, the failure rates of output failure modes of the functional system analysis model representing the functional system architecture of said safety-critical system comprise tolerable hazard rate thresholds of the respective failures.

The embodiment further provides according to a further aspect a software tool.

The embodiment provides according to the second aspect a software tool used for designing, analyzing, monitoring, simulating and/or controlling a safety-critical system wherein the software tool is adapted to perform the steps of the method according to the first aspect of embodiments of the present invention.

The embodiment further provides according to a further aspect an analyzing system.

The embodiment provides according to this aspect an analyzing system for analyzing a safety-critical system having a physical system architecture represented by a physical system analysis model and having a functional system architecture represented by a functional system analysis model, wherein the analyzing system is adapted to perform the steps of the method according to the first aspect of embodiments of the present invention. In embodiments, the analyzing system may include a processor configured for performing the methods described herein.

The embodiment further provides according to a further aspect a safety-critical system.

The embodiment provides according to this aspect a safety-critical system comprising a plurality of internal components, wherein at least one internal component is adapted to perform the method according to the first aspect of embodiments of the present invention or wherein at least one internal component forms an interface to at least one external component adapted to perform the method according to the first aspect of embodiments of the present invention.

BRIEF DESCRIPTION

Some of the embodiments will be described in detail, with references to the following Figures, wherein like designations denote like members, wherein.

DETAILED DESCRIPTION

Figure 1:
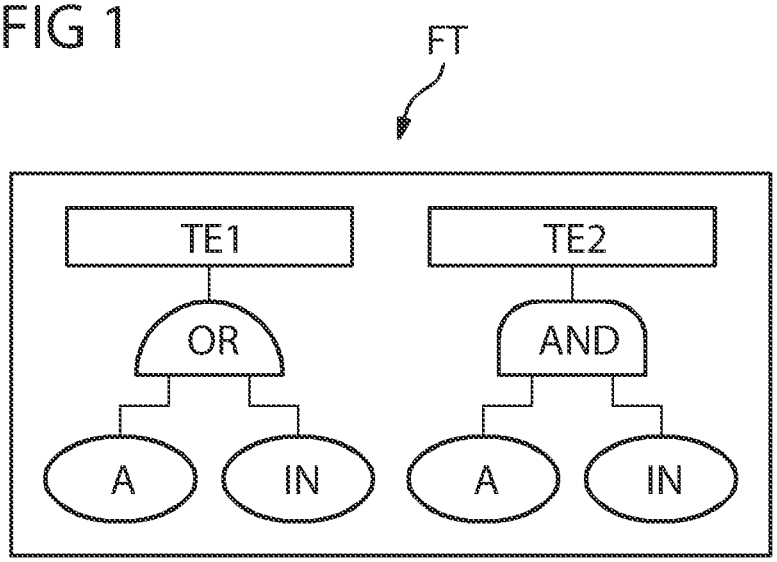
FIG. 1 shows an example of a conventional fault tree.
Figure 2:
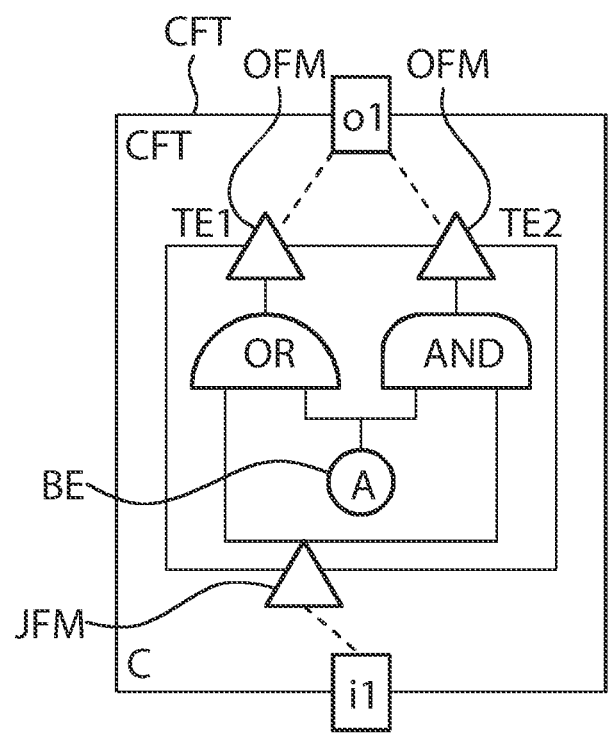
FIG. 2 shows an exemplary component fault tree for a component.

FIG. 1 shows a conventional fault tree FT which can be used to model a failure behavior of a safety-critical system SYS. FIG. 2 shows a component fault tree CFT of a component. The component fault tree CFT as shown in FIG. 2 is a Boolean model associated to system development elements such as components of a system. The component fault tree CFT illustrated in FIG. 2 has the same expressive power as a classic fault tree FT as illustrated in FIG. 1. Like a classic fault tree, a component fault tree CFT can be used to model a failure behavior of a safety-critical system SYS. This failure behavior can be used to document that a respective system is safe and can also be used to identify drawbacks within the design of the safety-critical system.

In component fault trees, a separate component fault tree element as illustrated in FIG. 2 is related to each component C of the system. The components C can comprise hardware components HWC, software components SWC and/or embedded components. Failures that are visible at an outport of such a component of the system SYS are modeled using output failure modes OFM which are related to the specific outport. In the illustrated example of FIG. 2, a component C comprises a component output O1 and a component input I1. In the illustrated example, the component C has two output failure modes OFM or top events TE1, TE2 that are visible at the outport O1 of the modeled component C. To model how a specific failure propagates from an inport of a component C to the outport of the component, input failure modes IFM are used. Further, the internal failure behavior that also influences the output failure modes is modeled using Boolean gates such as an OR gate and an AND gate as well as basic events BE. In the example of FIG. 2, a component fault tree element comprises a basic event A connected to an OR gate and an AND gate.

Every component fault tree CFT can be transformed to a conventional fault tree FT by removing the input and output failure mode elements. In the classic fault tree FT as illustrated in FIG. 1 and in the component fault tree CFT as illustrated in FIG. 2, top events or output events TE1 and TE2 are modeled. A component fault tree model allows, additionally to the Boolean formula that are also modeled within the classic fault tree, to associate the specific top events TE to the corresponding ports where these failures do appear. The first top event TE1 for example does appear at output port O1 of the component. Also, the second top event TE2 does appear at this port O1. Using this methodology of components also within fault tree models benefits during the development can be observed, for example an increased maintainability of the safety analysis model.

The method according to embodiments of the present invention can be used for analyzing and designing a physical system architecture of a safety-critical system SYS. Each safety-critical system SYS comprises a plurality of components C. These components can comprise hardware components, software components and/or embedded software components. The safety-critical system SYS has a physical system architecture PSYS-A comprising these components C wherein the physical system architecture can be represented by a physical system analysis model PSYS-AM. The physical system analysis model PSYS-AM represents the physical system architecture PSYS-A of the safety-critical system SYS. Further, a functional system analysis model FSYS-AM can represent the functional system architecture FSYS-A of the safety-critical system SYS. Accordingly, for each safety-critical system SYS, a functional system analysis model FSYS-AM of a functional system architecture FSYS-A of the safety-critical system SYS and a physical system analysis model PSYS-AM representing the physical system architecture PSYS-A of the safety-critical system SYS can be provided. In a possible embodiment, both the physical system analysis model PSYS-AM and the functional system analysis model FSYS-AM can be provided in an architecture description language and stored in a database or memory.

With the method according to embodiments of the present invention, the physical system analysis model PSYS-AM representing the physical system architecture PSYS-A of the safety-critical system SYS is modified incrementally until calculated failure rates or failure modes of the physical system analysis model PSYS-AM are less or equal to failure rates of corresponding failure modes of a functional system analysis model FSYS-AM representing a functional system architecture FSYS-A of the safety-critical system SYS.

Figure 3:
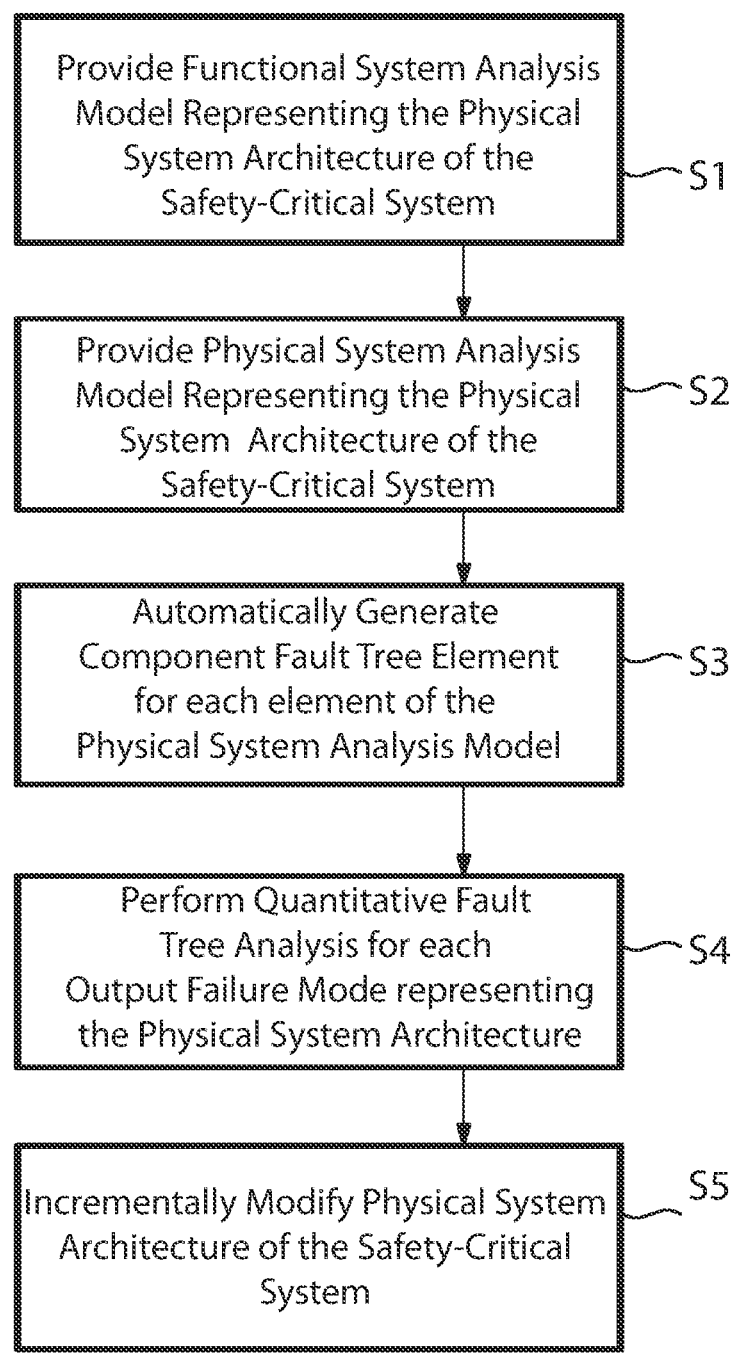
FIG. 3 shows a flowchart of a possible exemplary embodiment of a method.

FIG. 3 shows a flowchart of a possible exemplary embodiment of the method for analyzing a physical system architecture of a safety-critical system SYS according to a first aspect of embodiments of the present invention.

In a first step S1, a functional system analysis model FSYS-AM of a functional system architecture FSYS-A of the safety-critical system SYS is provided. For each function F within the functional system architecture FSYS-A of the safety-critical system SYS, a component fault tree, CFT, element is specified having failure modes FM representing safety and reliability requirements of the safety-critical system SYS. For each function F of the functional system architecture FSYS-A, a component fault tree, CFT, element can be specified having input failure modes and/or output failure modes, wherein for each failure mode FM, a failure rate is specified which represents a corresponding safety or reliability requirement of the safety-critical system SYS.

In a further step S2, a physical system analysis model PSYS-AM representing the physical system architecture PSYS-A of the safety-critical system SYS is provided. For each function F of the functional system architecture FSYS-A associated elements within the physical system architecture PSYS-A adapted to implement the respective function F are specified in step S2.

In a further step S3, for each associated element of the physical system analysis model PSYS-AM, a component fault tree, CFT, element is generated automatically based on the specified relationship between the functional system analysis model FSYS-AM and the physical system analysis model PSYS-AM of the safety-critical system SYS. For each failure mode FM of a component fault tree, CFT, element specified for a function F of the functional system analysis model FSYS-AM implemented by the associated element in the physical system analysis model PSYS-AM, a corresponding failure mode FM is created in the respective component fault tree, CFT, element. The generated component fault tree, CFT, element of the associated element of the physical system analysis model PSYS-AM comprises information available in the component fault tree, CFT, elements of the respective functions F within the functional system analysis model FSYS-AM implemented by the associated element.

In a further step S4, a quantitative fault tree analysis FTA, for each output failure mode OFM of the physical system analysis model PSYS-AM representing the physical system architecture PSYS-A is performed. The physical system analysis model PSYS-AM consists of the generated component fault tree elements. The quantitative fault tree analysis FTA is performed for each output failure mode OFM of the physical system analysis model PSYS-AM to calculate a failure rate of the respective output failure mode OFM.

In a further step S5, the physical system architecture PSYS-A of the safety-critical system SYS is modified incrementally until the calculated failure rates $\lambda$ of failure modes FM of the physical system analysis model PSYS-AM become less or equal to failure rates $\lambda$ of corresponding failure modes FM of the functional system analysis model FSYS-AM representing the functional system architecture FSYS-A of the safety-critical system SYS. All failure rates $\lambda$ of the output failure modes OFM of the physical system analysis model PSYS-AM can be compared pairwise with the failure rates $\lambda$ of the corresponding output failure modes OFM of the functional system analysis model FSYS-AM consisting of the component fault tree, CFT, elements of the functions F within the functional system architecture FSYS-A of the safety-critical system SYS. In a possible embodiment, the failure rates $\lambda$ of output failure modes OFM of the functional system analysis model FSYS-AM representing the functional system architecture FSYS-A of the safety-critical system SYS can comprise tolerable hazard rate thresholds THR of the respective failures.

In a possible embodiment, logical/functional architecture FSYS-A of the safety-critical system SYS can be defined in a model-based way using for example an architecture description language such as SYSML. The functional architecture FSYS-A of the safety-critical system SYS represents the functions F of the safety-critical system SYS and their interaction. For each function F of the functional system architecture FSYS-A, a component fault tree, CFT, element can be specified having input failure modes IFM and output failure modes OFM. For each output failure mode OFM, a failure rate $\lambda$ can be specified which represents a corresponding safety or reliability requirement of the safety-critical system SYS. Accordingly, safety and reliability requirements can be specified for the functional system architecture FSYS-A using component fault tree, CFT, elements. Thereby, a component fault tree, CFT, element can be specified for each function F within the logical/functional architecture of the system SYS. Both safety and reliability requirements of a function are represented within the CFT element. As a further step, a physical system architecture PSYS-A of the safety-critical system SYS can be defined which is supposed to realize the given functional architecture. The physical system architecture PSYS-A can also be described in a model-based way using an architecture description language such as SYSML. By using dependencies, it is possible to specify which functions F are implemented by which elements within the physical system analyzing model PSYS-AM representing the physical architecture of the safety-critical system SYS. Based on this relationship, it is possible to derive the physical system analysis model PSYS-AM of the physical system architecture PSYS-A in form of component fault tree, CFT, elements. The component fault tree, CFT, elements of this model can then be refined in a further step to represent the properties of the system architecture in terms of safety and reliability. Then, the qualitative and quantitative fault tree analysis FTA can be performed for the physical system architecture PSYS-A. Results of this fault tree analysis FTA can be compared with the requirements specified as a component fault tree of the logical/functional architecture. If all requirements are satisfied, the physical system architecture PSYS-A satisfies the defined requirements concerning safety and reliability. If not, the system architecture is modified and compared again until all specified safety and reliability requirements are satisfied.

The logical/functional architecture of the safety-critical system SYS can be modeled by using any architecture description language such as SYSML. In addition to the functional system analyzing model FSYS-AM, a CFT can be specified to represent safety and reliability requirements of the system under design. Thereby, a CFT element can be specified for each function F within the functional architecture of the system. In a possible embodiment, both safety and reliability requirements of a function can be represented within one single CFT element in the form of output failure modes OFM. The failure rate λ of an output failure mode OFM can represent a tolerable hazard rate THR of the respective failure. Input failure modes IFM can represent requirements for data/signals transmitted via the connected ports in form of a maximum tolerable hazard rate THR, if a λ value is defined. The basic events BE within the CFT element represent an upper bound of a random hardware failure of the physical components which implement the function F and therefore a requirement for the realization of the respective function F.

Figure 4:
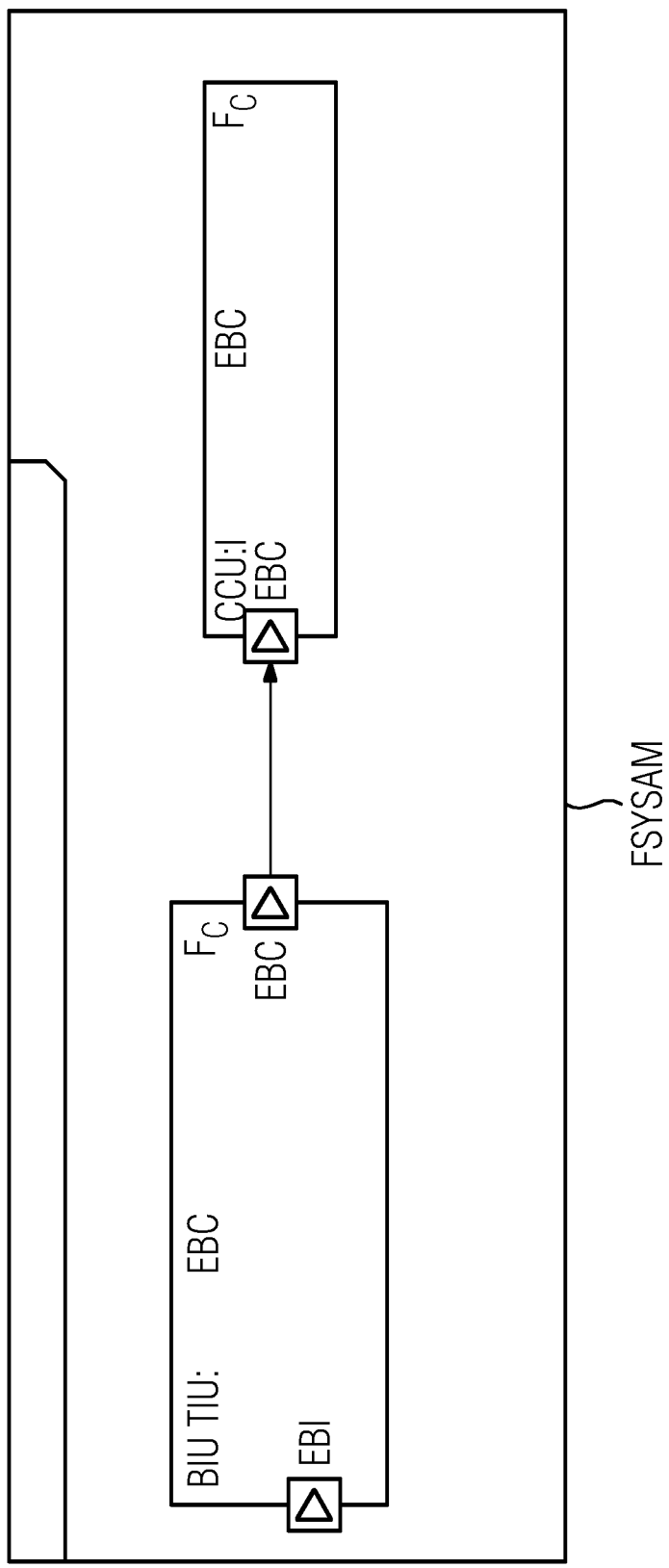
FIG. 4 shows an example of a functional system architecture for a safety-critical system.

FIG. 4 illustrates an example of a logical/functional system analyzing model FSYS-AM representing a functional system architecture FSYS-A of a safety-critical system SYS. The safety-critical system SYS is in the illustrated embodiment a safety-critical system SYS comprising a brake interface unit BIU and a train interface unit TIU. The functional system analyzing model FSYS-AM of a functional system architecture FSYS-A comprises in the illustrated example of FIG. 4 two functions connected to each other in a flow. An emergency brake intervention EBI triggers an emergency brake command received by a CCU (central control unit).

Figure 5:
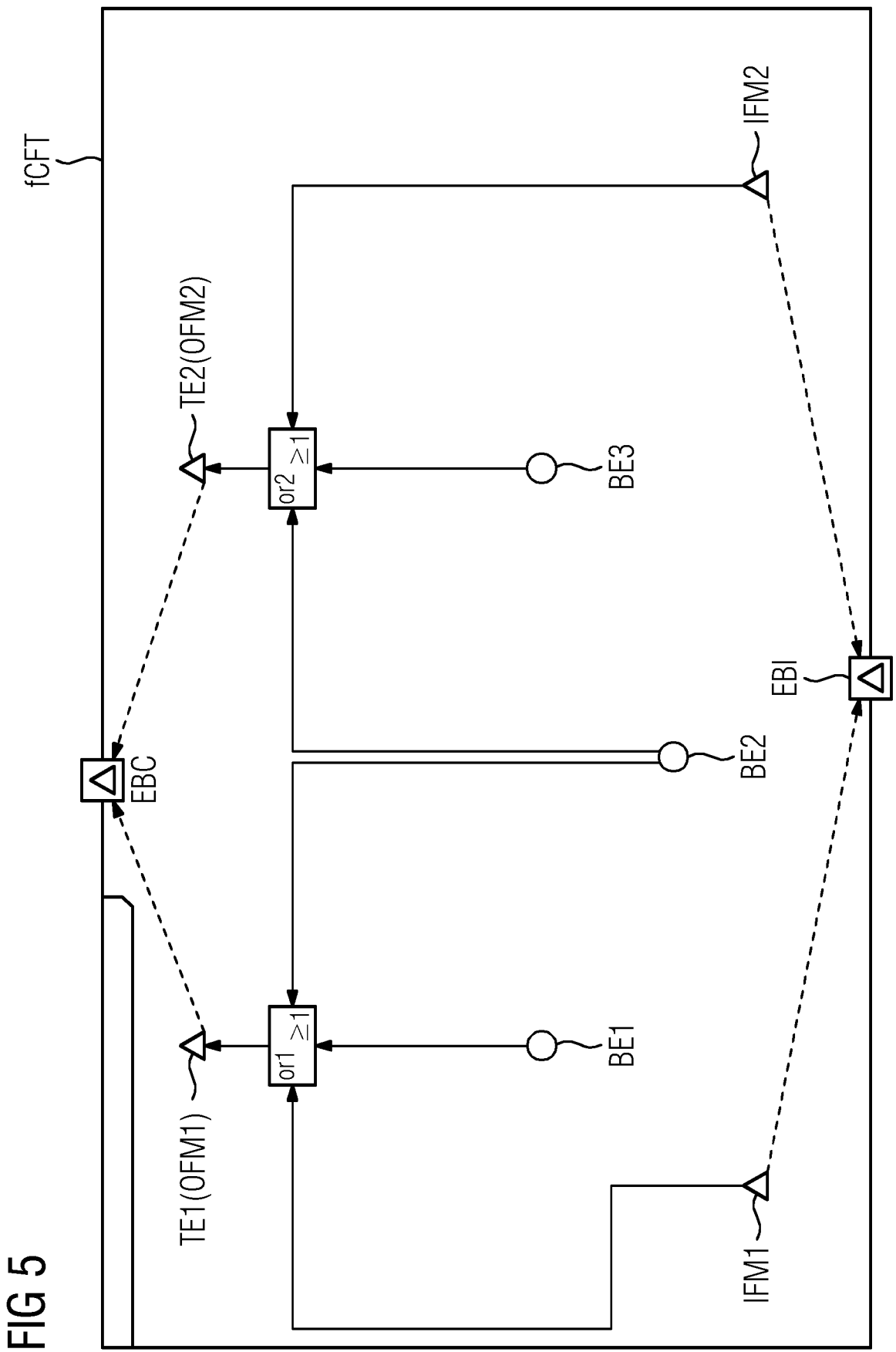
FIG. 5 shows an example of a component fault tree element which can be used in a functional system analysis model.

FIG. 5 illustrates an example of a component fault tree, CFT, element which can form part of a functional system analyzing model FSYS-AM. The CFT element illustrated in FIG. 5 comprises a functional input port to receive an emergency brake intervention EBI and a functional output port to issue an emergency brake command EBC.

Two input failure modes IFM1, IFM2 are associated with the emergency brake intervention EBI. The first input failure mode IFM1 is "EBI not signaled when required". The second input failure mode IFM2 is "EBI signaled when not required".

Both input failure modes IFM1, IFM2 are connected to an OR gate of the CFT element as illustrated in FIG. 5. A first OR gate performs a logical OR operation of the first input failure mode IFM1 with the first basic event BE1 and a second basic event BE2. The other OR gate performs a logical OR operation of the second input failure mode IFM2 with the second basic event BE2 and a third basic event BE3 as illustrated in FIG. 5. In the illustrated example, the first basic event BE1 is "Internal Failure causing no or too late Emergency Brake Signal". The second basic event BE2 is in the illustrated example "Common Cause Failure of Emergency Brake Failure Modes". The third basic event BE3 is "Internal Failure causing Emergency Brake Signal when not required".

As illustrated in FIG. 5, the first OR gate is connected with a first output failure mode OFM1 or top event TE1. The second OR gate is connected with a second output failure mode OFM2 or top event TE2. In the illustrated example, the first top event TE1 (OFM1) is "Emergency Brake not or too late commanded when required". This has a failure rate of $\lambda=1E-8$. The second top event TE2 (OFM2) is "Emergency Brake commanded when not required" with a failure rate λ of $2E-7$.

Figure 6:
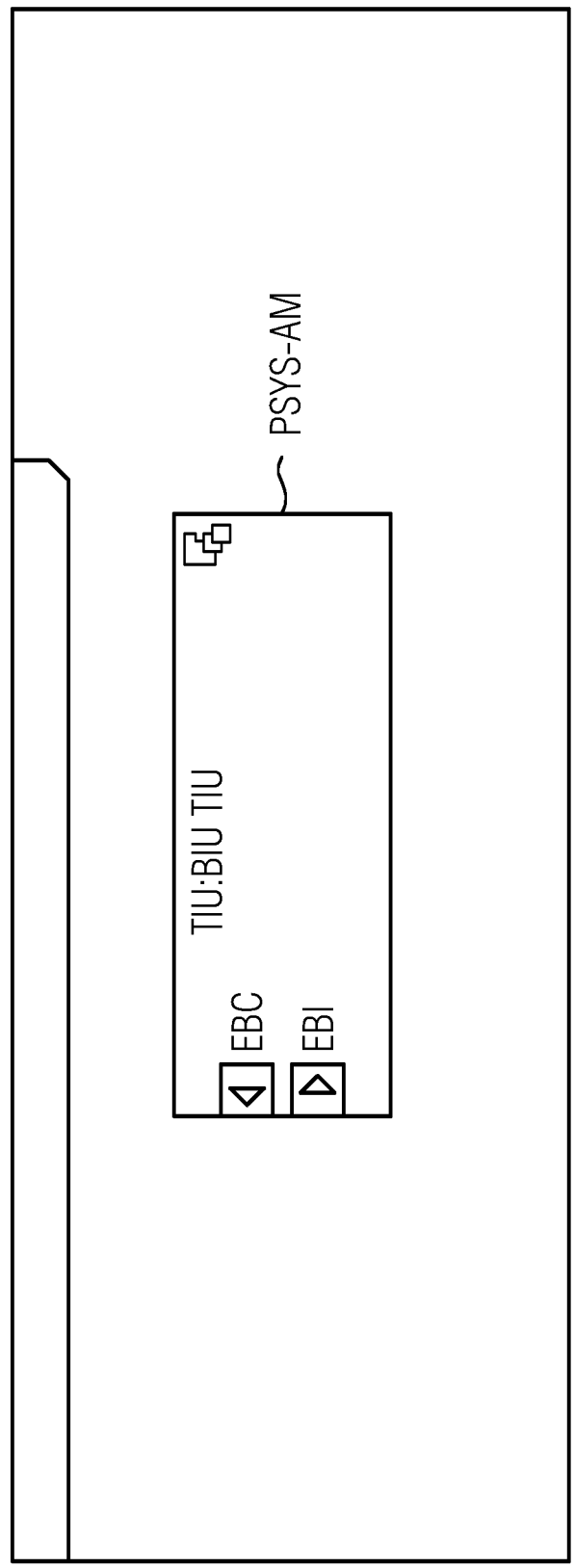
FIG. 6 shows an example of a physical system architecture for a safety-critical system.
Figure 7:
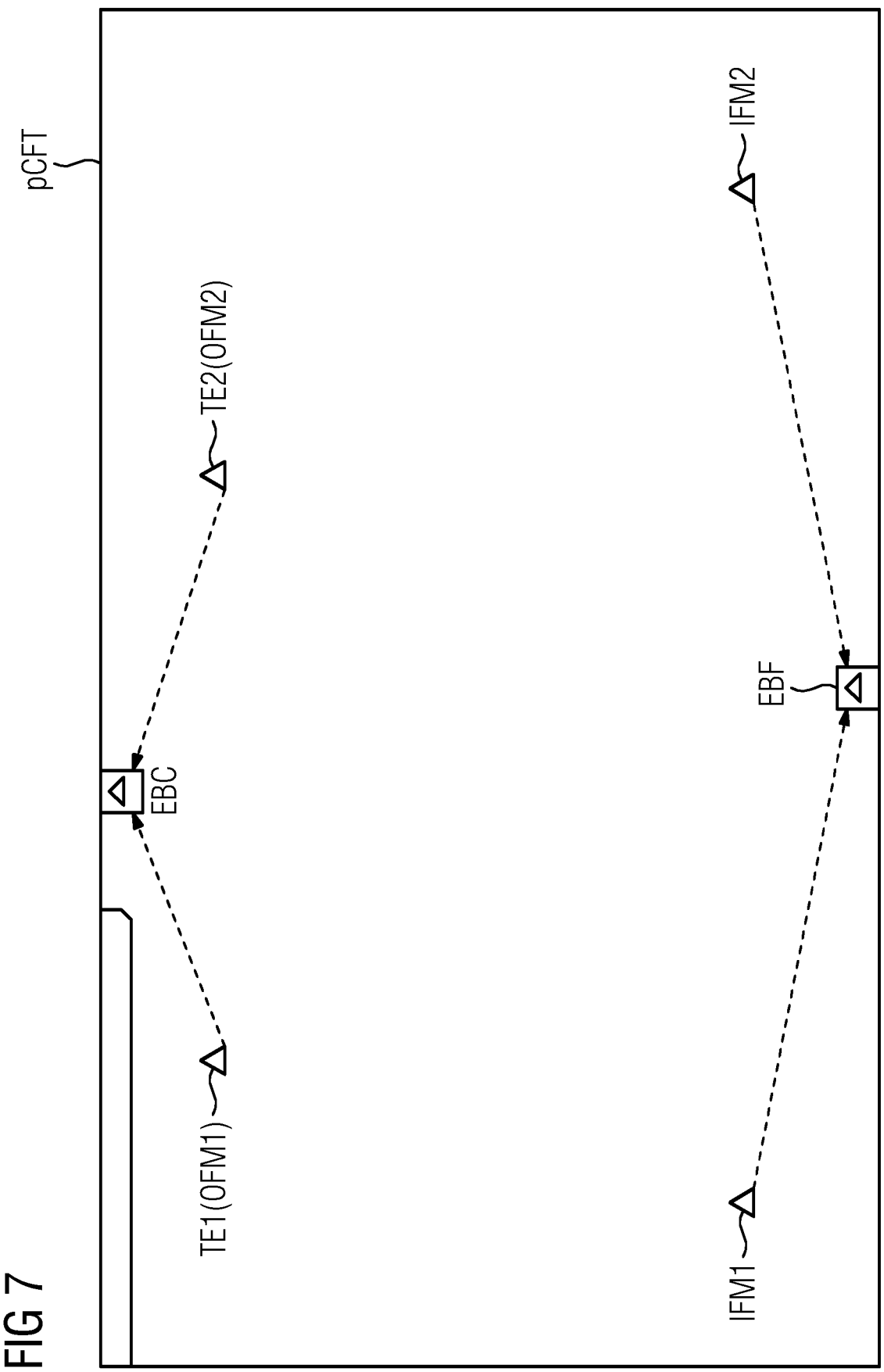
FIG. 7 shows an example of a derived CFT element which can form part of a physical system analyzing model.

FIGS. 4, 5 illustrate an example for the specification of a functional architecture of the safety-critical system SYS. FIGS. 6, 7 illustrate an example for the specification of the physical architecture of the safety-critical system SYS. The physical architecture of the safety-critical system SYS can also be modeled using an architecture description language such as SYSML. Moreover, it is specified which functions F are implemented by which of the elements of the physical system architecture PSYS-A using dependencies within the model. Based on these relationships between the functional architecture and the physical architecture, the system analysis model of the physical system architecture is derived from the CFT of the respective functional architecture. Accordingly, a component fault tree element is created for each element of the physical architecture of the safety critical system SYS. In a possible embodiment, the component fault tree, CFT, elements are filled automatically with information available in the component fault tree, CFT, elements of the functional architecture of the system represented by the functional analyzing model.

For each output failure mode OFM as well as for each input failure mode IFM of the functional architecture elements which are implemented by a specific element in the physical architecture, an output failure mode OFM or input failure mode IFM is created automatically within the respective CFT element. Moreover, a dependency is created between the failure modes FM on the logical architecture and the ones on the physical architecture. Moreover, for each AND gate within the CFT elements of the functional system architecture, an AND gate is created in the respective CFT elements of the physical architecture elements. This is done, since all AND gates represent a failure mitigation mechanism which must also be represented in the physical system architecture.

Afterwards, the CFT model is completed by adding basic events BE for random hardware faults and connecting these basic events and input failure modes IFM with the output failure modes OFM using Boolean gates. This can be done for all CFT elements.

FIG. 6 shows an example of a physical system analyzing model PSYS-AM. An emergency brake intervention EBI triggers an emergency brake command EBC.

For each associated element of the physical system analysis model PSYS-AM, a component fault tree, CFT, element can be generated based on the specified relationship between the functional system analysis model FSYS-AM and the physical system analysis model PSYS-AM of the safety-critical system SYS.

FIG. 6 shows an example of a derived CFT element of the functional architecture as is depicted in FIG. 5. FIG. 6 shows a CFT element which can form part of a physical system analyzing model PSYS-AM having a physical inport and a physical outport. At the physical inport, an emergency brake intervention EBI can be applied. At the physical outport, an emergency brake command EBC can be output. Similar to the functional CFT element illustrated in FIG. 5, the physical CFT element shown in FIG. 7 comprises two input failure modes IFM1, IFM2 and two output failure modes OFM1, OFM2 also called top events TE1, TE2. The input failure modes IFM and the output failure modes OFM of the CFT elements illustrated in FIGS. 5, 7 are identical. Accordingly, the CFT element which can form part of a physical system analyzing model PSYS-AM shown in FIG. 7 can be derived automatically from the functional CFT element shown in FIG. 5. The CFT element as illustrated in FIG. 7 can be derived automatically for each element in the physical system analyzing model PSYS-AM representing the physical architecture of the safety-critical system SYS. The CFT element which can form part of a physical system analyzing model PSYS-AM illustrated in FIG. 7 can then be completed with additional information. The generated component fault tree element of the associated element of the physical system architecture model PSYS-AM is filled automatically with information or data available in the component fault tree elements of the respective functions F within the functional system architecture model FSYS-AM implemented by the associated element.

Figure 8:
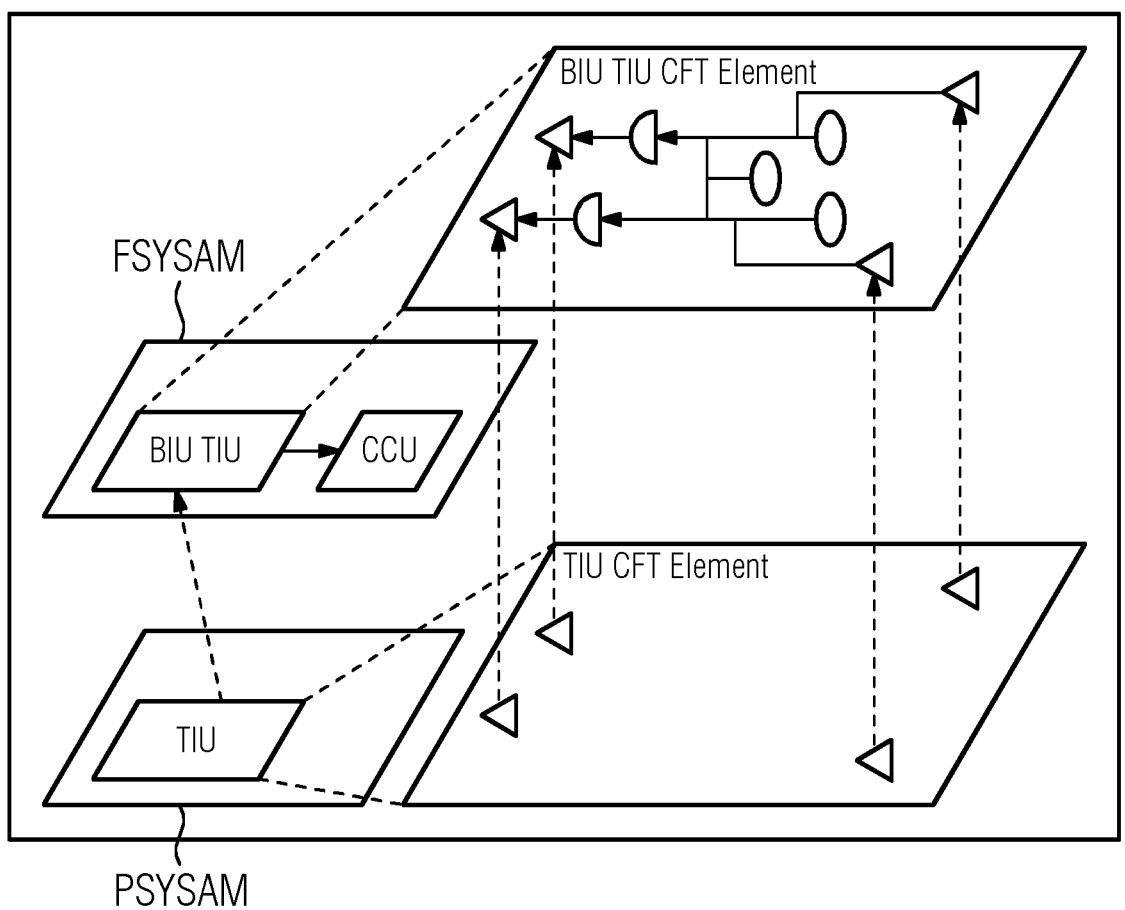
FIG. 8 shows an example of mapping elements of a functional system analyzing model for elements of a physical architecture of a safety-critical system and its CFT elements.

FIG. 8 illustrates the mapping of elements of the functional system analyzing model FSYS-AM to the elements of the physical system analyzing model PSYS-AM and its CFT elements.

Based on the physical system architecture PSYS-AM and the CFT elements specified for each element of the architecture, a CFT is created for the system which is the basis for safety and reliability analysis. The quantitative fault tree analysis FTA is then performed for each output failure mode OFM of the physical system analysis model PSYS-AM consisting of the generated CFT elements and filled with the available information to calculate a failure rate of the respective output failure mode OFM (each top event TE).

Figure 9:
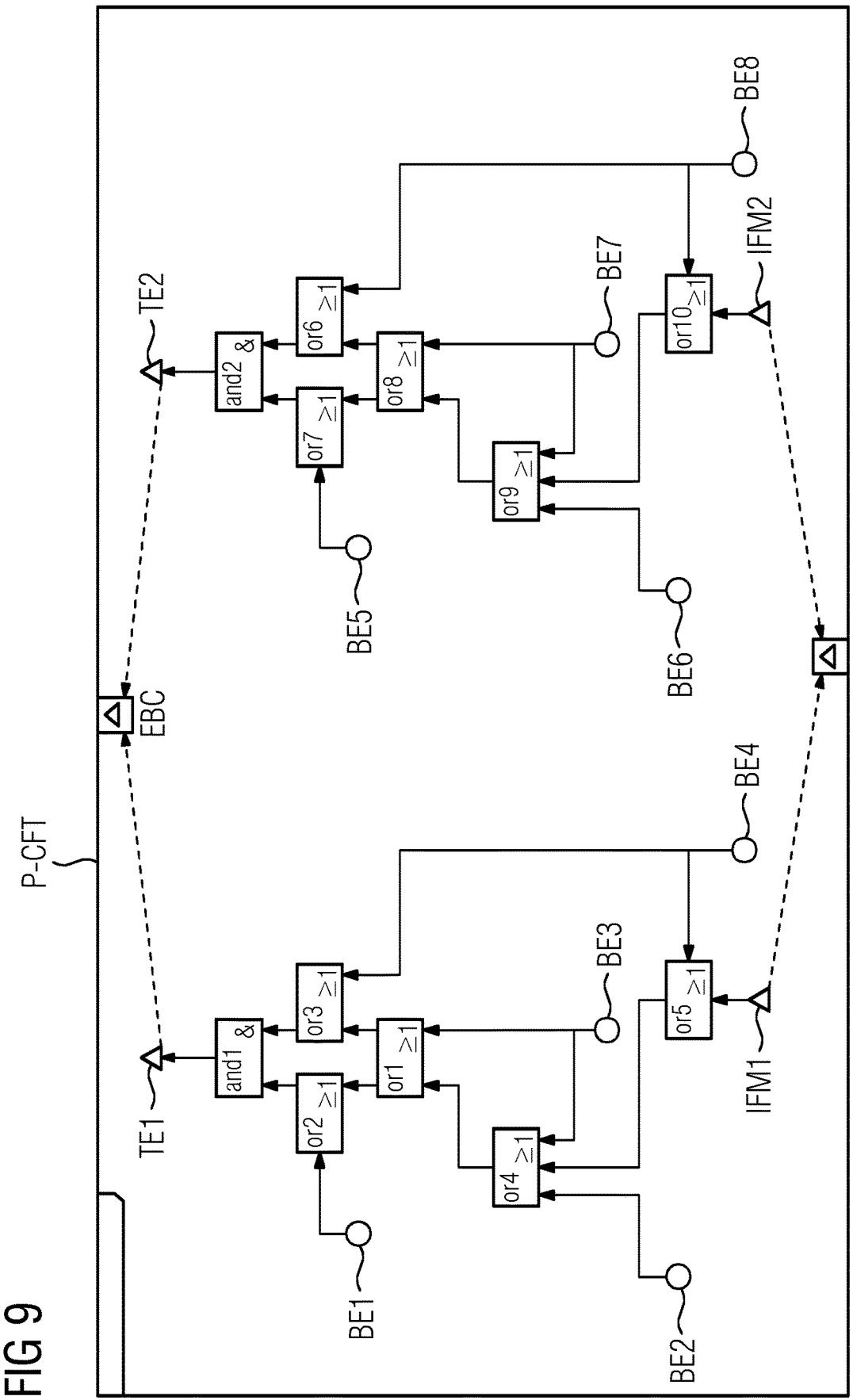
FIG. 9 shows an example of a completed CFT element of a physical system which can form part of a physical system analyzing model.

FIG. 9 shows an example of a completed CFT element within the physical system analyzing model PSYS-AM as also illustrated in FIG. 6. The completed CFT element has eight basic events as follows:

BE1: HW driver failure causing no or too late Emergency Brake Signal {failure rate=fit}
BE2: CPU failure causing no or too late Emergency Brake Signal {failure rate=fit}
BE3: Internal bus defect {failure rate=fit}
BE4: Bus driver failure causing no signal or signal too late {failure rate=fit}
BE5: HW driver failure causing Emergency Brake Signal when not required {failure rate=fit}
BE6: CPU failure causing Emergency Brake Signal when not required {failure rate=fit}
BE7: Erroneous internal bus transfer {failure rate=fit}
BE8: Bus driver failure causing signal when not required {failure rate=fit}

The results of the quantitative FTA analysis can be compared in a possible embodiment with the requirements specified by the CFT of the functional system architecture FSYS-A. Thereby, it can be checked if the failure rates $\lambda$ of the top events TE of the physical system analyzing model PSYS-AM are less equal to the failure rates $\lambda$ defined by the respective output failure modes OFM in the functional system architecture model FSYS-AM. Moreover, if failure rates $\lambda$ are specified in the input failure modes IFM within the CFT elements on the functional layer, also these values can be compared with the results of a quantitative FTA of the physical system architecture PSYS-A (intermediate results of the analysis of the top events), which again must be less or equal.

In addition, the sum of the failure rate $\lambda$ of the basic events BE of the elements, which implement a function, and contribute to a specific top event TE can be compared with the failure rate $\lambda$ of the basic event BE defined in the CFT element of the function. Again, the failure of the physical architecture must be less or equal to the value specified on the functional level. Such checks contribute to the identification of possibilities to improve a physical architecture of the safety-critical system SYS if the safety or reliability requirements are not fulfilled, since they do indicate potential weak points of the physical architecture of the system. This approach goes one step beyond the known concept of parts count. AND gates in the path between basic events BE and output failure modes OFM can be treated appropriately since AND gates represent failure mitigation mechanisms, such as redundancy concepts.

If all requirements are satisfied, the physical system architecture PSYS-A satisfies the defined requirements concerning safety and reliability. If not, the system architecture is modified incrementally and compared again until all specified safety and reliability requirements are satisfied.

For instance, in the given example, it can be checked if the top event TE "Emergency Brake not or too late commanded when required" has a failure rate $\lambda$ less or equal to $10^{-8}$/h and if the top event TE "Emergency Brake commanded when not required" has a failure rate $\lambda$ less or equal to $2 \cdot 10^{-7}$/h. If so, then the specified physical architecture does satisfy the safety and reliability requirements with which the functional architecture is annotated using CFTs.

The method according to embodiments of the present invention can be performed in a semi- or fully-automated process to systematically develop a safe and reliable system architecture according to predefined non-functional requirements, in particular safety and reliability requirements.

The system architecture, i.e. the functional system architecture and the physical system architecture, can be predefined. Further, CFT elements on both the functional system level and the physical system level can be provided stored in a database. The CFT elements of the physical architecture can be generated semi- or fully automatically to ensure a consistency between the analysis models of the functional and the physical system architecture. Moreover, it can be checked automatically if the system architecture fulfills all safety and reliability requirements.

A degree of automation can be increased, if building blocks of the physical system architecture PSYS-A are already available in form of a CFT model stored in a database. It is possible to build different variants of the physical system architecture PSYS-A and to perform a quantitative safety analysis automatically. Further, the comparison of the analysis results for each top event TE with the requirements from the functional architecture can be performed automatically. Hence, various system variants can be evaluated automatically, if CFT elements are already available for each of the elements of the physical system architecture and stored in the database.

Furthermore, it is possible to build a new physical system architecture PSYS-A fully automatically for a new/modified functional system architecture using the method according to embodiments of the present invention if all elements of the functional, logical architecture of the safety-critical system SYS have already been mapped to the physical system architecture of the safety-critical system SYS. Hence, a new physical system architecture (or a variant of an existing physical architecture) can be created and assessed in terms of safety and reliability solely by defining and/or modifying the functional/logical system architecture.

The method and system according to embodiments of the present invention support a systematic creation of a physical system architecture PSYS-A which satisfies the specified safety and reliability requirements. Therefore, it can be ensured that the resulting system architecture satisfies the safety and reliability requirements defined in the functional system architecture FSYS-A. Since the safety and reliability properties of the architecture are assessed early and continuously throughout the development life cycle, costs due to changes of the system architecture can be avoided in case that safety analyses are performed at the end of the design and fail. The method according to embodiments of the present invention is able to automatically derive parts of the safety analysis model of the physical system architecture PSYS-A in form of a CFT. Moreover, preexisting or predefined CFT elements can be reused along with corresponding elements of the architecture. Thus, the effort of safety and reliability assessment processes of complex safety-critical systems SYS can be significantly reduced. The method according to the first aspect of embodiments of the present invention can be implemented in a software tool. This software tool can be used for designing, analyzing, monitoring, simulating and/or controlling any kind of safety-critical system SYS. The method according to the first aspect of embodiments of the present invention can in a possible embodiment be performed by a component of the safety-critical system SYS itself. This can be an internal component of the safety-critical system SYS or a component which is connected to the safety-critical system SYS via an interface. Still further, embodiments include a computer program product, comprising a computer readable hardware storage device having computer readable program code stored therein, said program code executable by a processor of a computer system to implement the method methods described herein.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A computer-implemented method for automatically analyzing and designing a physical system architecture of a safety-critical system stored in a memory, comprising:

incrementally modifying a physical system analysis model representing the physical system architecture of said safety-critical system until calculated failure rates of failure modes of said physical system analysis model are less or equal to failure rates of corresponding failure modes of a functional system analysis model representing a functional system architecture of said safety-critical system to ensure that the resulting physical system architecture satisfies safety and reliability requirements defined in the functional system architecture and to minimize costs due to changes;

wherein the functional system architecture represents functions of the safety-critical system and their interaction, wherein the physical system architecture comprises hardware components, software components and/or embedded software components represented in said physical system analysis model, wherein for each function of the functional system architecture a component fault tree, CFT, element is specified having input failure modes and/or output failure modes, wherein for each failure mode, a failure rate is specified which represents a corresponding safety or reliability requirement of said safety-critical system, wherein a failure rate X of a respective output failure mode of the functional system analysis model comprises a tolerable hazard rate threshold of the respective failure, and if X value is defined, input failure modes represent requirements for signals transmitted via connected ports in form of a maximum tolerable hazard rate, and wherein for each function of the functional system architecture represented by the functional system analysis model associated elements within the physical system architecture represented by the physical system analysis model adapted to implement the respective function are specified.

2. The method according to claim 1, wherein for each associated element of the physical system analysis model a component fault tree, CFT, element is generated automatically based on the specified relationship between the functional system analysis model and the physical system analysis model of said safety-critical system.

3. The method according to claim 1, wherein for each failure model of a component fault tree, CFT, element specified for a function of the functional system analysis model implemented by the associated element in the physical system analysis model a corresponding failure mode is created in the respective component fault tree, CFT, element.

4. The method according to claim 1, wherein the generated component fault tree, CFT, element of the associated element of the physical system analysis model comprises information available in the component fault tree, CFT, elements of the respective functions within the functional system analysis model implemented by the associated element.

5. The method according to claim 1, wherein a quantitative fault tree analysis, FTA, is performed for each output failure mode of the physical system analysis model consisting of including the generated component fault tree, CFT, elements to calculate the failure rate of the respective output failure mode.

6. The method according to claim 1, wherein all failure rates of the output failure modes of the physical system analysis model are compared pairwise with the failure rates of the corresponding output failure modes of the functional system analysis model including the component fault tree, CFT, elements of the functions within the functional system architecture of said safety-critical system.

7. The method according to claim 1, wherein the physical system analysis model representing the physical system architecture of said safety-critical system and the functional system analysis model representing the functional system architecture of said safety-critical system are modeled in an architecture description language and stored in the memory.

8. The method according to claim 7, wherein the architecture description language is SYSML.

9. A computer program product, comprising a non-transitory computer readable hardware storage device having computer readable program code stored therein, said program code executable by a processor of a computer system to implement the method according to claim 1.

10. An analyzing system including a processor configured for analyzing a safety-critical system having a physical system architecture represented by a physical system analysis model and having a functional system architecture represented by a functional system analysis model wherein the analyzing system is adapted to perform the method according to claim 1.

11. A safety-critical system comprising a plurality of internal components, including at least one hardware component, wherein at least one internal component is adapted to perform the method according to claim 1 or forms an interface to at least one external analyzing unit adapted to perform the method.

* * * * *